UNITED STATES PATENT OFFICE.

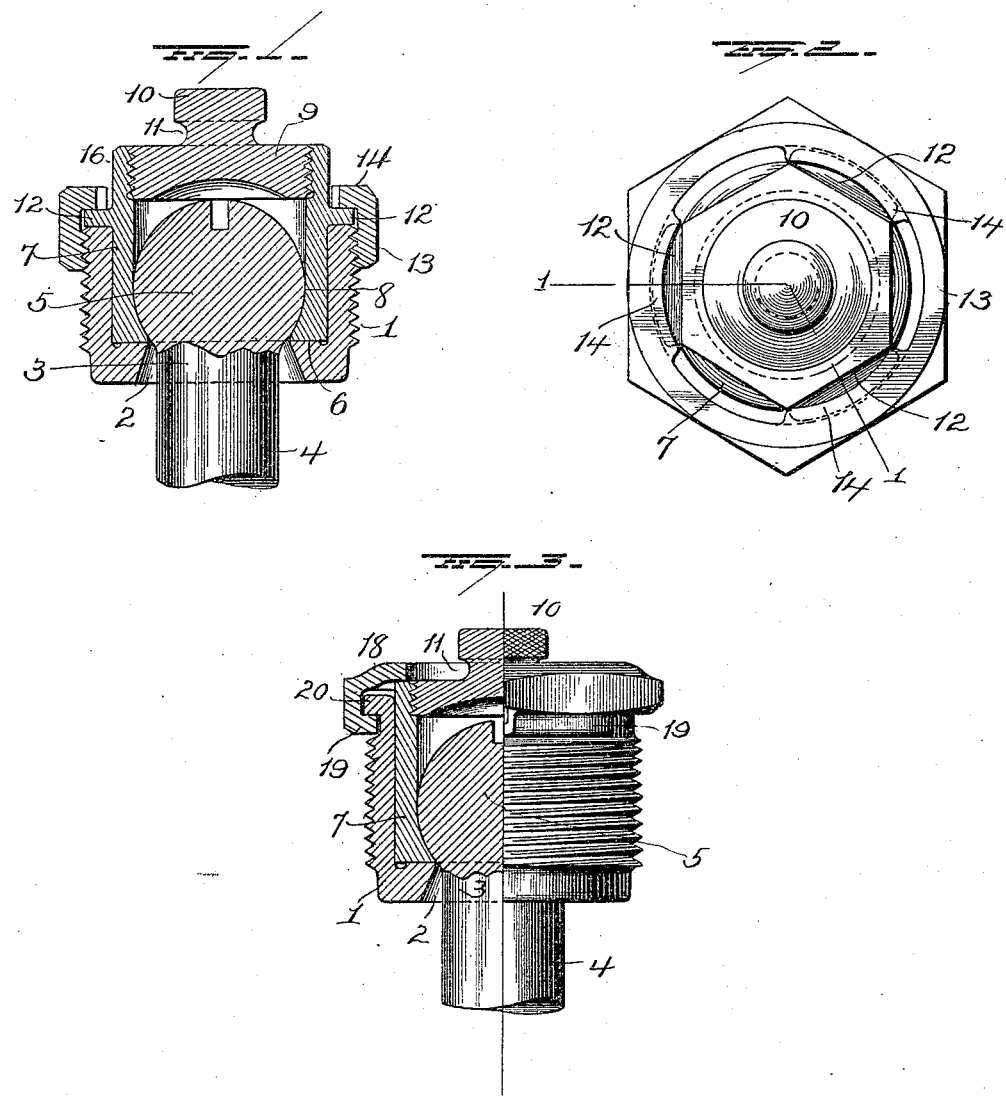

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,295,868.   Specification of Letters Patent.   Patented Mar. 4, 1919.

Application filed May 3, 1918. Serial No. 232,310.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures and more particularly to the bearing and closure devices for the head of the staybolt,—the object of the invention being to provide simple and compact devices for housing and providing a bearing for the head of the staybolt and to so construct said devices that the staybolt may be tested without removal of the housing and bearing parts.

With this and other objects in view, the invention consists in certain novel features of construction and combinations of parts as hereinafter set forth and pointed out in the claims.

In the accompanying drawings, Figure 1 is a longitudinal sectional view of a staybolt structure showing an embodiment of my invention. Fig. 2 is a plan view, and Fig. 3 is a view of a modification.

1 represents a sleeve or bushing having a tapering opening 2 at its inner end for the accommodation of the neck portion 3 of a staybolt 4 and the latter is provided with a rounded or spherical head 5. The bushing 1 is provided at its inner end with an annular seat 6 for the inner end of a sleeve 7 which enters and neatly fits within the bushing 1. The sleeve 7 is provided interiorly with a curved face 8 constituting a bearing for the rounded head of the staybolt and said sleeve extends outwardly beyond the bushing 1 and is internally threaded for the reception of a plug 9 having a head 10,—the latter being grooved or undercut as shown at 11 for a purpose hereinafter explained. The sleeve 7 is also provided externally with a plurality of segmental lugs or shoulders 12,—three such lugs being shown in the drawing.

A locking ring 13 is threaded on the bushing 1 and is provided with a plurality of inwardly projecting lugs or shoulders 14 corresponding in number with the lugs or shoulders 12 on the sleeve 7. By the use of the threaded plug 9, the end of the bearing sleeve 7 will be closed over the head of the staybolt and it also facilitates the assembling of the staybolt in its bearing sleeve. This plug may be retained permanently in place after the staybolt structure shall have been assembled unless it should become necessary to remove the bolt in the event of breakage of the latter. When the parts are first assembled, the lugs or shoulders 12 on the bearing sleeve will alternate with the lugs or shoulders 14 on the locking ring. By now turning the sleeve 7 (the latter being made with an external angular portion 16 to receive a wrench), the lugs 12 on the sleeve will become disposed behind the lugs 14 on the locking ring and by then turning the latter slightly, the lugs on the respective members will bind tightly against each other and the parts will be held securely in place.

When it is desired to test the bolt, the locking ring may first be turned slightly and then the sleeve 7 may be turned until the lugs 12 thereon shall alternate with the lugs 14 on the locking ring. The operator will then, by the application of a suitable tool to the head or knob 10, attempt to pull or pry the sleeve away from its seat in the bushing. Should he be unable to do this, the fact that the bolt is whole would be indicated.

In the form of the invention shown in Fig. 3, a locking ring 18 is provided and disposed so that a portion thereof will rest against the outer end of the bearing sleeve 7,—the rear portion of said locking ring being provided with inwardly projecting segmental lugs or shoulders 19 to coöperate with segmental lugs or shoulders 20 at the outer end of the bushing 1.

Having fully described my invention what I claim as new and desire to secure by Letters-Patent, is:

1. In a staybolt structure, the combination with a bushing, of a sleeve mounted freely in said bushing and affording a bearing for the head of the staybolt, and a locking ring interposed between said bushing and sleeve and coöperable with both.

2. In a staybolt structure, the combination with a bushing, of a sleeve mounted freely therein and affording a bearing for the head of the staybolt, and a locking ring to engage said bushing and sleeve and to have interlocking relation with one of said parts.

3. In a staybolt structure, the combination with a bushing, of a sleeve mounted therein and affording a bearing for the head of a staybolt, said sleeve having a plurality of external lugs, and a locking ring threaded on said bushing and provided with inwardly projecting segmental shoulders coöperable with the external lugs on said sleeve.

4. In a staybolt structure, the combination with a bushing, of a sleeve mounted therein and affording a bearing for the head of a staybolt, a closure for the outer end of said sleeve and having a part projecting outwardly therefrom to be engaged by a tool, and locking means for securing said sleeve to the bushing.

In testimony whereof, I have signed this specification in the presence of two subscribing witnesses.

ETHAN I. DODDS.

Witnesses:
S. G. NOTTINGHAM,
R. S. FERGUSON.